(12) United States Patent
Otte

(10) Patent No.: US 7,090,265 B2
(45) Date of Patent: Aug. 15, 2006

(54) MOUNTING FOR A RADIATOR CASING IN A MOTOR VEHICLE

(75) Inventor: Hans-Hermann Otte, Varel (DE)

(73) Assignee: Decoma (Germany) GmbH, Sulzbach (DE)

( * ) Notice: Subject to any disclaimer, the term of this patent is extended or adjusted under 35 U.S.C. 154(b) by 61 days.

(21) Appl. No.: 10/876,881

(22) Filed: Jun. 25, 2004

(65) Prior Publication Data

US 2005/0006913 A1    Jan. 13, 2005

(30) Foreign Application Priority Data

Jun. 25, 2003    (DE) ............................... 103 29 624

(51) Int. Cl.
*B62D 25/08*    (2006.01)
(52) U.S. Cl. .................... 293/115; 296/193.1; 180/68.6
(58) Field of Classification Search ............. 296/193.1, 296/187.09; 180/68.6; 293/115
See application file for complete search history.

(56) References Cited

U.S. PATENT DOCUMENTS 6,527,317 B1 *   3/2003   Fox et al. ................... 293/115

FOREIGN PATENT DOCUMENTS

| DE | 35 26 909 C2 | 7/1985 |
| DE | 35 23 909 A1 | 1/1987 |
| DE | 100 13 427 A1 | 3/2000 |
| DE | 100 13 427 A1 | 9/2001 |
| EP | 0 484 641 A1 | 5/1992 |
| EP | 0 484 641 B1 | 3/1994 |
| JP | 56-31846 | 3/1981 |

* cited by examiner

*Primary Examiner*—Joseph D. Pape

(57) ABSTRACT

A radiator casing (1) on a bumper (3) of a vehicle, particularly of a motor car, is achieved using a mounting such that the radiator casing (1) is movable, be means of bearings (7,9) arranged on both sides of the radiator, on a swivel axis (13) disposed transversely to the direction of travel, on the one hand downwards diagonally with respect to the direction of travel into a stop position and after reaching the stop is pivotable in the direction of travel into a lockable basic position and on the other hand in the event of a collision is movable into and unlockable in a deflected position which can be moved back in the opposite direction to the direction of travel.

4 Claims, 4 Drawing Sheets

MOUNTING FOR A RADIATOR CASING IN A MOTOR VEHICLE

BACKGROUND OF THE INVENTION

1. Field of the Invention

The invention relates to a mounting for a radiator casing on a front bumper of a vehicle, particularly a motor car.

2. Brief Description of the Related Art

JP 5 631 846 A discloses a front end part wherein the bumper and the radiator casing part are joined together by means of a latching connection. This latching connection comprises separate components which first have to be inserted in the bumper. Then the radiator casing part has to be pushed into these separate components from behind. Corresponding mounting work is needed to attach the radiator casing to the bumper.

EP 0 484 641 B1 discloses a mounting for a radiator of a motor car which is arranged underneath the bumper bar adjacent to a front end casing part of the bumper bar. In the event of impact on the front end part or the bumper the radiator remains undamaged and fully operational as it is able to deflect resiliently and uniformly counter to a spring force about a swivel axis.

Finally, DE 35 23 909 discloses a front bumper for vehicles, particularly motor cars, wherein a radiator grill is secured to the bumper by means of a latching connection. The latching connection comprises a latching peg integrally formed on the radiator grill in the lower part thereof and engaging in a shaped hole which tapers towards the front in the upper wall portion of the bumper. The latching connection is not made until the latching peg has moved upwards in the shaped hole. Disengagement of the radiator grill in the event of impact is prevented by barb-like securing lugs which engage in corresponding longitudinal holes in the upper wall portion of the bumper in the mounted position of the radiator grill and each abut with a substantially vertical locking surface against the rear boundary of the associated oblong hole. In the event of a person hitting the front end part of a motor car, even if the car is traveling at low speed, this does not prevent either damage to the radiator grill or injury to the person.

SUMMARY OF THE INVENTION

According to one aspect of the invention, there is provided a mounting for a radiator casing on a bumper of a vehicle, particularly a motor car, which permits simple and cheap fitting of the radiator casing on the bumper and reliably ensures protection for a person in the event of the person hitting the radiator casing when the car is traveling at low speed.

The radiator casing can easily be secured by suspending it from the mounting pins which form the swivel axis and subsequently pivoting it in the direction of travel into the basic position of engagement on the bumper. Moreover in the event of a person being hit by the radiator casing of a moving car the radiator casing is moved out of the basic position into the deflected position without damage to the radiator casing or harm to the person. After the impact the radiator casing is simply moved out of the deflected position back into the normal basic position. The guide-lines generally in force for the protection of persons in Europe or the USA, for example, which apply to the impact of people against the front end parts of vehicles, are met using very simple means.

Further advantages and embodiments of the invention will become apparent from the description and the accompanying drawings.

It will be appreciated that the features mentioned above and those yet to be described hereinafter may be used not only in the combination specified but also in other combinations or on their own without departing from the scope of the present invention.

BRIEF DESCRIPTION OF THE DRAWINGS

The invention is schematically illustrated in the drawings by means of an exemplifying embodiment and will be described in detail hereinafter with reference to the drawings, wherein.

DETAILED DESCRIPTION OF THE INVENTION

Figure 1:
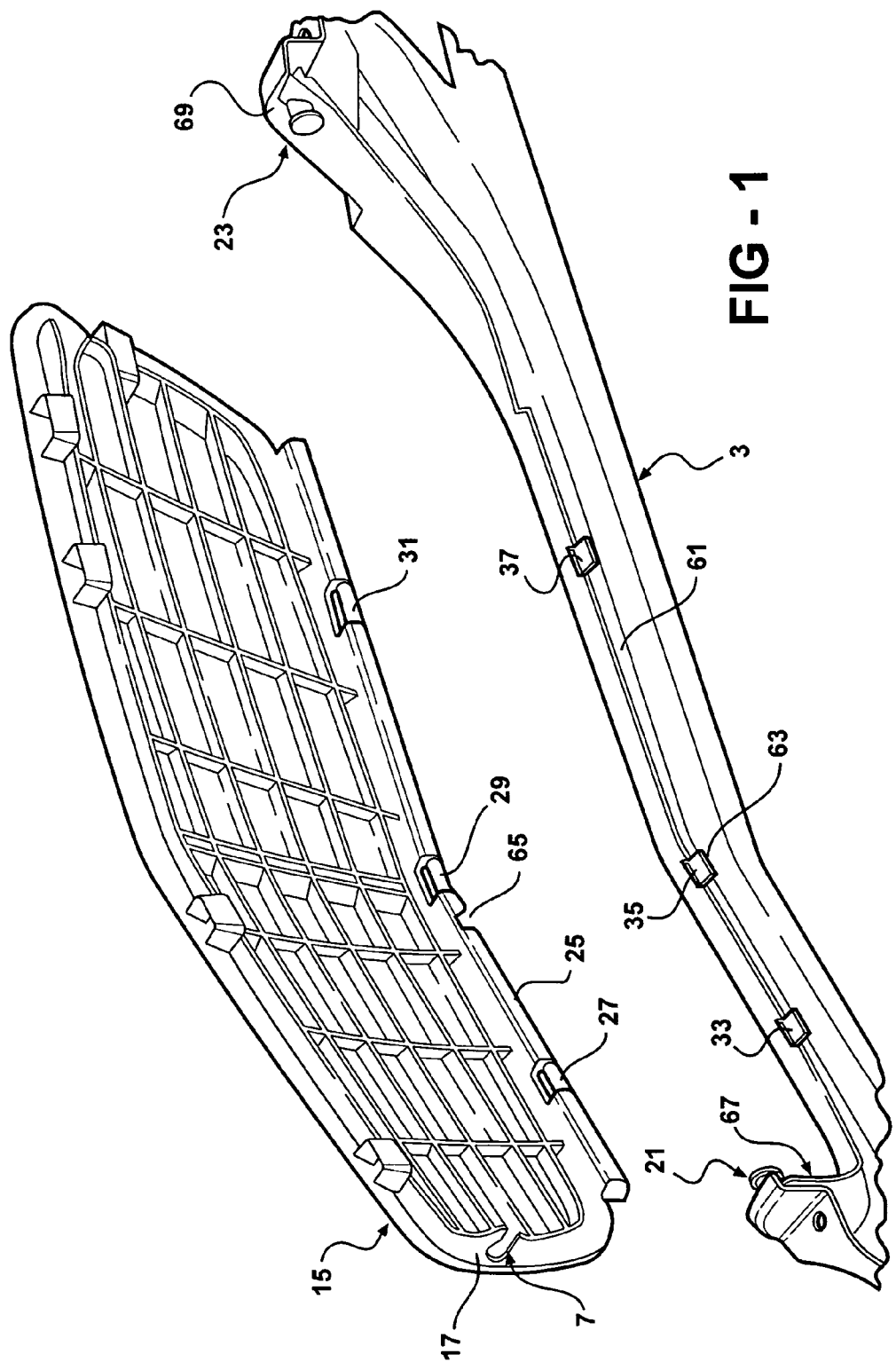
FIG. 1 shows a schematic perspective view of a radiator casing according to the invention and a bumper of a vehicle.

FIG. 1 shows a mounting for a radiator casing 1 on a front bumper or bumper cladding element 3 of a vehicle, particularly a motor car, wherein the radiator casing 1 can be releasably attached to the bumper 3 by means of a latching connection. The radiator casing 1 has bearings 7, 9 on both sides of the radiator 5 (not shown in detail) which is to be covered, these bearings enabling the radiator casing 1 to be moved downwards, diagonally with respect to a direction of travel 11 of the vehicle, in the direction of the arrow 12, into a stop position, along a swivel axis 13 disposed substantially transversely of the direction of travel 11, and after reaching the stop to be swiveled in the direction of travel into a lockable basic position. For this purpose the radiator casing 1 has in an upper edge area 15 suspension eyelets 17, 19 open at the bottom and formed as bearings 7, 9 of oblong construction, which can be suspended from the mounting pins 21, 23 that form the swivel axis 13.

Moreover, a lower longitudinal edge 25 of the radiator casing 1 is provided with latching means which can be latched to complementary latching means on the bumper 3 by swiveling the radiator casing 1. The latching means on the lower longitudinal edge 25 of the radiator casing 1 are preferably latching recesses 27, 29, 31, in which latching tongues 33, 35, 37 provided (as complementary latching means) on the bumper 3 are able to engage. In the installed position a locking edge 39 of the latching tongue 33 abuts on a locking surface 41 in the latching recess 27.

Figure 2:
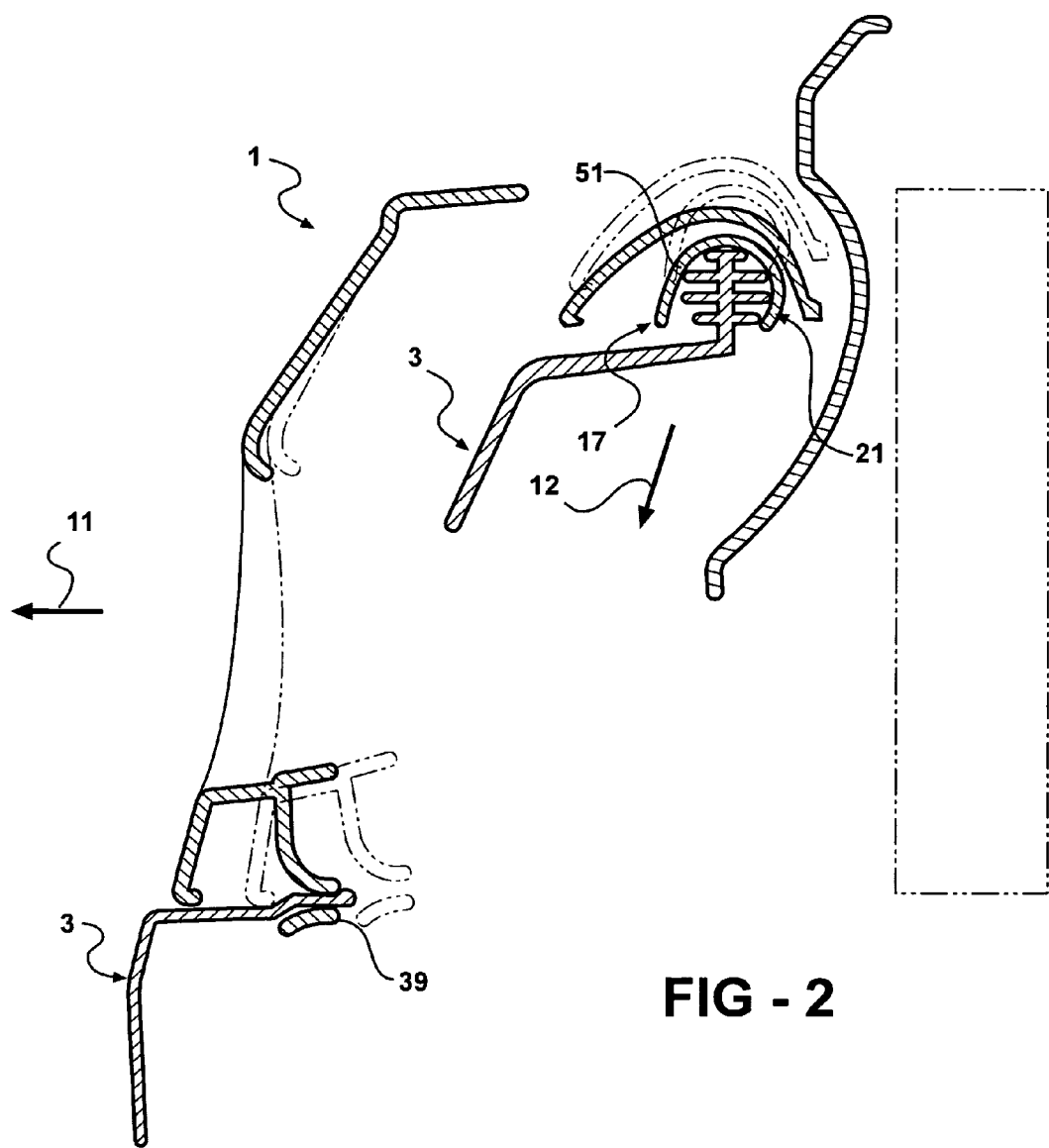
FIG. 2 shows a sectional side view of the radiator casing of FIG. 1 in the basic position and in the deflected position.

FIG. 2 shows the radiator casing 1 according to the invention with the bumper 3 after assembly and locking, shown by continuous lines, whereas the released (deflected) position (pivoted counter to the direction of travel) is shown by broken lines.

Figure 3:
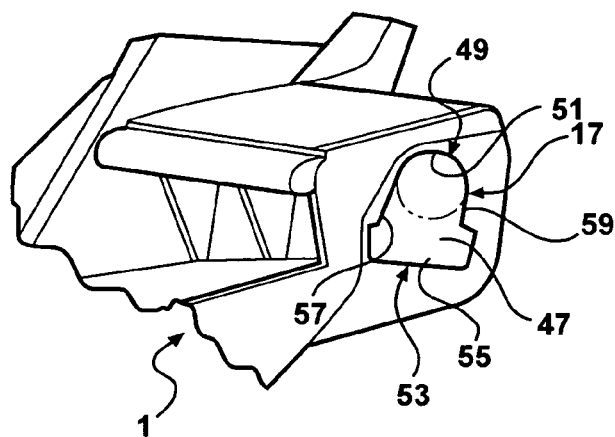
FIG. 3 shows a suspension eyelet of the radiator casing of FIG. 1.
Figure 4:
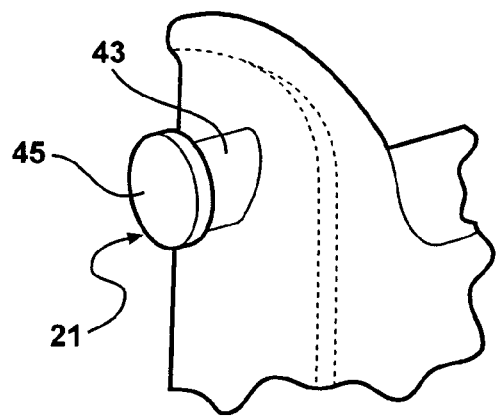
FIG. 4 shows a mounting pin on the bumper of FIG. 2.
Figure 5:
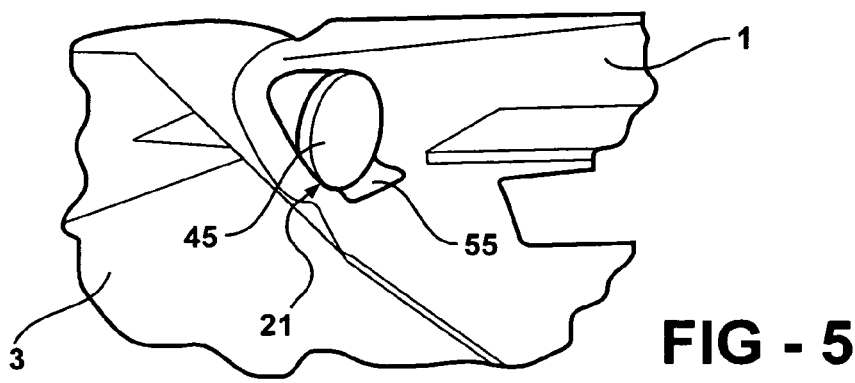
FIG. 5 shows the mounting pin and a suspension eyelet of FIGS. 3 and 4 in the installed position.
Figure 6:
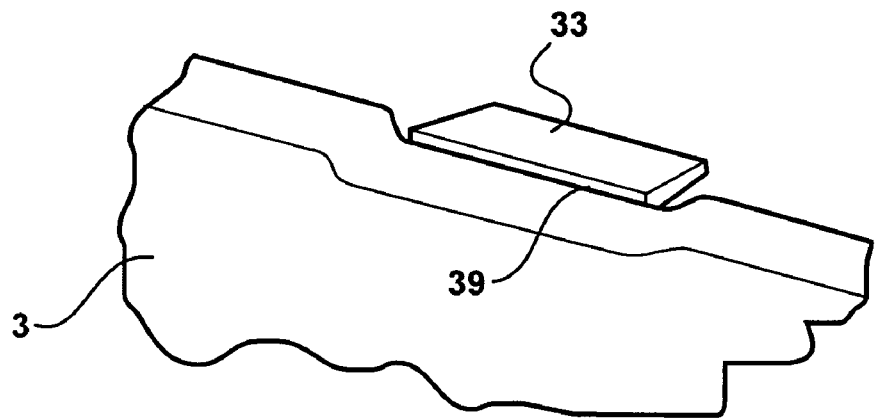
FIG. 6 shows latching recesses in the radiator casing according to the invention of FIG. 1.
Figure 7:
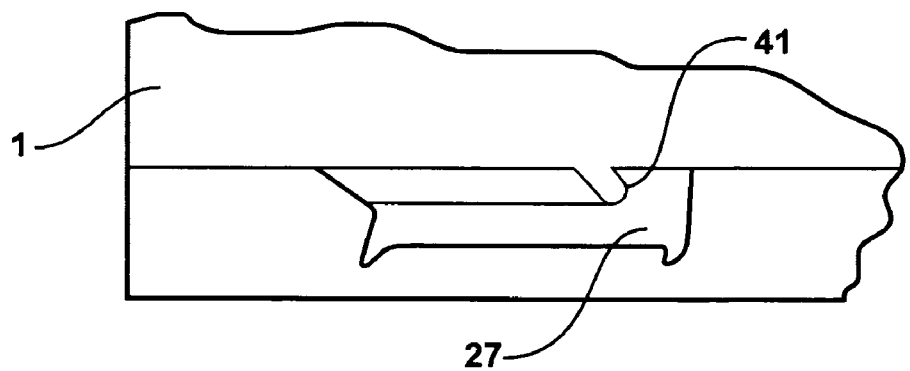
FIG. 7 shows a latching tongue on the bumper in FIG. 2.

FIGS. 3 to 5 show details from FIG. 1, while FIG. 3 shows the suspension eyelet 17 of the radiator casing 1, FIG. 4 shows the mounting pin 21 and FIG. 5 shows the suspension eyelet suspended from the mounting pin.

The mounting pin 21 includes an inwardly projecting cylinder 43 which co-defines the swivel axis 13 and a cylindrical collar 45 formed on the free end thereof. The mounting recess 17 includes an oblong shaped hole 47 which has at one end 49 a mounting point 51 adapted to the diameter of the cylinder 43 of the mounting pin 21 and at the other end 53 has a widened rectangular cross sectional opening 55 which allows the cylindrical collar 45 on the mounting pin 21 to pass through. Suspending the radiator casing 1 from the bumper 3 is made easier by the fact that the suspension eyelets 17, 19 have guide edges 57, 59 which run diagonally from the circular mounting points 51 to the cross sectional opening 55.

The mounting pins 21, 23 are advantageously arranged on mounting arms 67, 69 which are preferably integrally formed in an upper part of the bumper 3. The mounting eyelets 17, 19 are located in the upper edge region 15 of the radiator casing 1 and project laterally inwards.

Simple centering of the radiator casing 1 when it is latched to the bumper 3 is achieved as a result of the fact that the bumper 3 has in its upper region 61 a projecting centering lug 63 which can be swiveled into a centering recess 65 in the radiator casing 1.

Within the scope of the invention it is of course also possible for the mounting eyelets to be provided on the bumper 3 and the mounting pins to be provided on the radiator casing 1. Similarly, the latching tongues 33, 35, 37 may be disposed on the radiator casing 1 and the corresponding latching recesses 27, 29, 31 on the bumper 3.

What is essential is that the mounting for the radiator casing 1 according to the invention provides the protection for persons required according to current guidelines in the event of a vehicle hitting a person.

What is claimed is:

1. A mounting for a radiator casing (1) on a front bumper of a vehicle wherein the radiator casing is releasably attached to the bumper by a latching connection, wherein the radiator casing (1) is pivotally supported by bearings (7, 9) formed on each side of a radiator (5) which is to be encased, and manually moveable on a swivel axis (13) disposed essentially transversely to a direction of travel, on the one hand diagonally with respect to the direction of travel (11) downwards into a stop position and after reaching the stop is pivotable in the direction of travel into a lockable basic position and on the other hand in the event of a collision is movable into and unlockable in a deflected position which can be moved back in the opposite direction to the direction of travel (11), wherein the radiator casing (1) has in an upper edge area (15) suspension eyelets (17, 19) open at the bottom and defining the bearings (7, 9) of oblong construction, for suspension from the mounting pins (21, 23) that form the swivel axis (13), and wherein on a lower longitudinal edge (25) the radiator casing (1) comprises latching recesses (27, 29, 31) which can be latched to complementary latching tongues (33, 35, 37) on the bumper (3) by swiveling the radiator casing (1).

2. A mounting according to claim 1, wherein the bumper (3) comprises a centering lug (63) which can be swiveled into a position of interlocking engagement in an associated centering recess (65) in the radiator casing (1).

3. A mounting according to claim 2, wherein the suspension eyelets (17, 19) are arranged projecting laterally inwards in the upper edge region (15) of the radiator casing (1).

4. A mounting according to claim 3, wherein the mounting pins (21, 23) are constructed on mounting arms (67, 69) which are integrally formed on the bumper (3).

* * * * *